United States Patent Office 3,269,937
Patented August 30, 1966

3,269,937
HYDROISOMERIZATION PROCESS
Maxwell Nager, Pasadena, John W. Jenkins, La Porte, and Lawrence W. Maas, Pasadena, Tex., assignors to Shell Oil Company, New York, N.Y., a corporation of Delaware
No Drawing. Filed Dec. 26, 1962, Ser. No. 247,327
1 Claim. (Cl. 208—135)

This invention relates to a process for the catalytic conversion of unbranched, or sparsely branched, hydrocarbons into hydrocarbons having a branched, or more highly branched, carbon chain, respectively.

It is known to convert unbranched or sparsely branched olefins into more highly branched paraffins by passing an olefinic starting material at elevated pressure and temperature and in the presence of hydrogen or a gas containing hydrogen, over an acid, solid isomerization catalyst on which are supported one or more sulfides, selenides, tellurides, arsensides and/or antimonides of the metals in the left-hand column of the sixth group and/or one or more sulfides, selenides, tellurides, arsenides and/or antimonides of the metals of the eighth group of the Periodic System of Elements.

These catalysts, which can, for brevity's sake, be denoted as hydroisomerization catalysts, consist of a combination of an acid isomerization component and a hydrogenating component. This combination has multifunctional properties and is capable of setting in train a complex of reactions that lead not only to skeleton isomerization but in which several other conversions, such as cyclization, cracking and polymerization, also play a part.

A certain disadvantage resulting from use of these catalysts is that, especially in the initial stages of the conversion process, the acid isomerization function and the hydrogenation function are generally not in proper balance so that other properties such as the cracking activity rather predominates, resulting in the formation of relatively large quantities of low-boiling products. A considerable proportion of the feed is found to be converted into gaseous, at least partially saturated, products, such as isobutane. Not only does this have a detrimental effect upon the yield of gasoline components, but it also involves a higher consumption of costly hydrogen. Since in practice, the hydroisomerization feed will be valuable gasoline fractions such as light catalytically cracked gasoline, propylene polymer, and the like, it is desirable from an economic point of view to obtain as much as possible of the product in the gasoline boiling range.

Yields can be increased during the initial onstream period by starting at relatively low reaction temperatures followed by gradual incremental increases in temperature. However, this method has the disadvantage that product quality is somewhat lower. Moreover, low temperature operation apparently increases catalyst activity decline rate and thus decreases life of the catalyst.

It has now been found that the formation of lower-molecular weight compounds can, to a considerable extent, be prevented without detriment to the quality of the desired product by exposing the catalysts to the influence of nitrogen compounds. While it is known from the literature that undesired activity of platinum catalysts such as reforming catalysts can be reduced by means of nitrogen compounds, it is in no way to be expected that in the complicated reaction mechanism involved in olefin hydroisomerization, nitrogen compounds would not have a disturbing effect, but, on the contrary, lead to an improved product.

In the process of the invention, unbranched or sparsely branched olefins are contacted at elevated temperature and pressure and in the presence of hydrogen or a gas containing hydrogen, with a hydroisomerization catalyst comprising a hydrogenation function deposited on an acid-acting support, such as nickel sulfide on an acid-acting refractory oxide support, e.g. silica-alumina, the characteristic feature of the process being that, before and/or during the catalytic conversion of the olefinic starting material, the catalyst is contacted with compounds of nitrogen.

Nitrogen compounds suitable for use in the present process are the organic nitrogen compounds such as, for example, amines, cyclic nitrogen compounds, including those cyclic compounds having the nitrogen within or without the ring, and the like. Basic nitrogen compounds are preferred. Ammonia can also be used. Under the operating conditions, most of the organic nitrogen compounds decompose to form ammonia.

The amount of nitrogen compound employed should be sufficient to give from about 50 to 300 p.p.m. N, basis hydrocarbon feed. The amount generally will be governed by such factors as operating conditions, nature of the nitrogen compound, nature of the catalyst, nature of the feed, e.g. olefinicity and molecular weight of the feed, and the like. A strong nitrogen base such as pyridine will in general be required in a lesser amount than an amine such as triethylamine. For example, for the hydroisomerization of a catalytically cracked gasoline with sulfided nickel on silica-alumina at olefin space velocities commonly practiced, pyridine in an amount to provide about 50 p.p.m. N would generally be sufficient whereas triethylamine in an amount to give 100–200 p.p.m. N would be required.

It is generally preferred to contact the catalyst with nitrogen compounds prior to introduction of the olefin to be converted. This can be done conveniently when the catalyst is being sulfided by injecting the nitrogen compounds into the sulfiding medium such as a sulfur-containing hydrocarbon or a mixture of hydrogen and hydrogen sulfide gas.

Suitable starting materials are gasolines, or fractions thereof, obtained by the thermal cracking of hydrocarbons with or without the presence of steam and catalytically cracking of high boiling petroleum fractions.

The catalytic cracking of hydrocarbon oils produces gasolines with a relatively high olefin content, as a result of which such gasolines and especially low-boiling fractions thereof, have high F–1 octane numbers, but quite low F–2 octane numbers, and thus have a high sensitivity.

By sensitivity it is meant the differences between the F–1 and F–2 octane numbers. This difference is of extreme importance because premium motor gasolines must have not only a high F–1 octane number but also the lowest possible sensitivity to meet the demands of present day high compression automotive engines.

Gasolines obtained in steam cracking of hydrocarbons are extremely unstable owing to the presence therein of a relatively very high content of strongly unsaturated hydrocarbons. On the other hand, these gasolines contain a high percentage of aromatic compounds and alkenes which have a high octane number and thus are particularly valuable as stable motor gasoline components.

Steam cracking is generally effected at temperatures between about 550 and 900° C., preferably between 750 and 800° C., and preferably at a pressure below about 5 atmospheres absolute. The amount of steam applied is generally 0.1–10 parts by weight and preferably about 1 part by weight per part by weight of starting material.

Steam cracking is preferably conducted on low-boiling hydrocarbon oils having a relatively high content of aliphatic hydrocarbons. Gasoline fractions obtained by straight-run distillation of crude mineral oil are therefore very suitable. Steam cracking is mainly applied for the preparation of gaseous olefins, in particular ethene and propene, which are used as base materials in the chemical industry. In the cracking process, which is preferably carried out in a tube furnace, more than 50% w. of the basic hydrocarbon oil is generally converted into compounds having four or fewer carbon atoms in the molecule. A secondary product of steam cracking is a gasoline generally containing more than 30% w. and sometimes even more than 60% w. of aromatic compounds and a considerable amount of olefins having a relatively high octane number. Such gasolines have very high F-1 octane numbers but have the disadvantage of a very high sensitivity.

These gasolines also contain a relatively high proportion of strongly reactive compounds, such as diolefins (partly of the cyclopentadiene type), acetylenic type, and compounds of the styrene type. The removal of these strongly reactive compounds is imperative because their presence makes the gasolines extremely unstable and thus, as a general rule, unsuitable for use as components for motor fuels.

In the present process olefinic and/or unstable gasolines are converted into gasolines that exhibit good stability, a high F-1 octane number, and low sensitivity.

Additional starting materials for the process of the invention are the olefinic gasolines obtained by polymerizing, for example propene to a product having 6 to 15 carbon atoms in the molecule.

The preferred catalyst in the olefin hydroisomerization process is 1–10% w. of nickel sulfide, based on the total catalyst, supported on an acidic cracking catalyst such as silica-alumina. Cracking catalysts containing 60%–90% w. silica are preferred, the remainder generally being alumina.

The total pressure at which the conversion is effected is generally between 10 and 150 atm. and in particular between 40 and 120 atm. High pressures are preferred as they are more effective in preventing coke formation on the catalyst, which generally occurs at pressures of less than 40 atm. Reaction temperature is in the range from about 200 to 400° C.

At high pressures, there is a tendency towards the formation of a higher percentage of unbranched paraffins in the conversion product. This tendency can be suppressed by performing the hydroisomerization in the presence of a small quantity of sulfur or especially volatile surfur compounds which are easily decomposed. Sulfur compounds suitable for this purpose are, among others, hydrogen sulfide, alkyl mercaptans, such as butyl mercaptan or pentyl mercaptan, dialkyl sulfides and dialkyl disulfides. The sulfur or sulfur compound can be passed over the catalyst as such or mixed with the olefinic starting material or with the hydrogen or hydrogen-containing gas. The amount of sulfur or sulfur compound(s) to be added is between 0.001 and 1.0% w. (calculated as sulfur) based on the olefinic starting material.

Sulfur can very suitably be added to the olefinic starting material in the form of a sulfur-containing hydrocarbon oil fraction, which is mixed with the olefinic starting material as a "diluent." The hydrocarbon oil fraction used as diluent has the added function of preventing undesirable rises in temperature during the hydroisomerization (which is an exothermic relation). Particularly suitable hydrocarbon oil fractions for this purpose are sulfur-containing naphthas, such as are straight-run naphthas obtained in the distillation of petroleum.

EXAMPLE I

A debutanized light catalytically cracked gasoline, i.e. boiling below 100° C. (212° F.) was hydroisomerized with a catalyst prepared by impregnating silica-alumina with an aqueous solution of a nickel salt, drying, calcining at 760° C., and sulfiding. The hydroisomerization was conducted in an adiabatic reactor at 60 atmospheres pressure, a volumetric liquid hourly space velocity of 0.5, a product recycle to fresh feed ratio of 3/1, and a hydrogen to total hydrocarbon feed molar ratio of 10/1. In one experiment, a constant inlet temperature was maintained. In another experiment the inlet temperature, initially relatively low, was increased stepwise. Results of the two experiments are summarized below in Table I.

*Table I*

|  | Constant Inlet Temp. | | | | Variable Inlet Temp. | | | |
| --- | --- | --- | --- | --- | --- | --- | --- | --- |
| Run hours | 50 | 500 | 900 | 1,200 | 50 | 500 | 900 | 1,200 |
| Inlet temp., ° C | 340 | 340 | 340 | 340 | 250 | 270 | 290 | 330 |
| Yield $C_{5+}$ Product, Percent w. basis feed | ca 65 | 78 | 83 | 87 | ca 88 | 93.5 | 94 | 93.5 |
| Properties of $C_{5+}$ product: | | | | | | | | |
| Bromine No | <1 | <1 | <1 | 3 | <1 | 1.5 | 3 | 3 |
| Octane number: | | | | | | | | |
| F-1, 1.5 | 94.3 | 94.2 | 94.1 | 93.5 | 92.7 | 91.1 | 91.3 | 92.4 |
| F-2, 1.5 | 93.0 | 92.8 | 92.7 | 92.0 | 92.2 | 90.7 | 90.2 | 91.6 |

It can be seen that lower inlet temperature results in a higher yield but that quality is lower. In addition, catalyst activity declined rapidly at the lower inlet temperatures.

EXAMPLE II

A blend of straight-run naphtha, thermal gasoline, and light catalytically cracked gasoline was hydroisomerized in a semi-isothermal reactor using sulfided nickel on silica-alumina cracking catalyst. The catalyst was sulfided by a 30 hour pretreatment with a $C_6/C_7$ naphtha containing 3% carbon disulfide. The hydroisomerization was effected at 50 atmospheres pressure, a volumetric liquid hourly space velocity of 1.3, and a hydrogen to oil molar ratio of 5/1. The feed had a bromine No. of 60 and contained 30 p.p.m. N.

In one experiment at a relatively low reactor inlet temperature of 315° C. (600° F.), the volumetric yield of $C_5+$ material was greater than 97.5% during the operating period of about 60 hours duration. In a second experiment which was at 357° C. (675° F.), the volumetric yield of $C_5+$ material was initially (at ca. 10 hrs.) about 88.5% but gradually increased with time and reached 97.5% after nearly 60 hours operation. In a third experiment, the catalyst was precontacted with nitrogen during the sulfiding step by including 100 p.p.m. N as pyridine in the sulfiding gas. With this catalyst and an operating temperature of 357° C. (675° F.), yields of $C_5+$ material in excess of 97.5 percent by volume were obtained.

We claim as our invention:

In the hydroisomerization of a normal olefin-containing gasoline fraction which comprises contacting said gasoline fraction in the presence of hydrogen at a temperature of about 200° to 400° C. and a pressure of about 40 to 120 atmospheres with an olefin hydroisomerization catalyst comprising from about 1% to 10% by weight sulfided nickel on silica-alumina cracking catalyst, the improvement which comprises conducting the contacting in the presence of ammonia in an amount to provide from about 50 to 300 p.p.m. nitrogen basis gasoline.

References Cited by the Examiner
UNITED STATES PATENTS

| | | | |
|---|---|---|---|
| 2,762,854 | 9/1956 | McKinley et al. | 260—683.65 |
| 2,849,377 | 8/1958 | Ogborn et al. | 260—683.65 |

FOREIGN PATENTS 878,035   9/1961   Great Britain.

DELBERT E. GANTZ, *Primary Examiner.*
ALPHONSO D. SULLIVAN, *Examiner.*
S. P. JONES, *Assistant Examiner.*